United States Patent
Konishi et al.

(10) Patent No.: US 7,807,239 B2
(45) Date of Patent: *Oct. 5, 2010

(54) OPTICAL FILM CONTAINING POLYMER HAVING NAPHTYL GROUP

(75) Inventors: Takahisa Konishi, Ibaraki (JP); Yutaka Ohmori, Ibaraki (JP); Hisae Sugihara, Ibaraki (JP); Miyuki Kurogi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 93 days.
This patent is subject to a terminal disclaimer.

(21) Appl. No.: 12/090,412
(22) PCT Filed: Oct. 17, 2006
(86) PCT No.: PCT/JP2006/320630
§ 371 (c)(1),
(2), (4) Date: Apr. 16, 2008
(87) PCT Pub. No.: WO2007/058041
PCT Pub. Date: May 24, 2007

(65) Prior Publication Data
US 2009/0116109 A1    May 7, 2009

(30) Foreign Application Priority Data
Nov. 21, 2005  (JP)  ............... 2005-335172

(51) Int. Cl.
G02B 5/30  (2006.01)
C08F 8/28  (2006.01)
C08F 216/38  (2006.01)
C08J 5/18  (2006.01)

(52) U.S. Cl. .................. 428/1.3; 349/96; 349/117; 349/118; 428/220; 428/524; 525/330.3; 525/383; 525/386

(58) Field of Classification Search .......... 428/1.3, 428/219, 220, 524; 525/330.3, 383, 386; 349/96, 117, 118
See application file for complete search history.

(56) References Cited

U.S. PATENT DOCUMENTS 2,380,032 A   7/1945  Dorough et al.
(Continued)

FOREIGN PATENT DOCUMENTS

EP   0150293 A1   8/1985
JP   2001-098027 A   4/2001

OTHER PUBLICATIONS

International Search Report of PCT/JP2006/320630, date of mailing Jan. 16, 2007.
(Continued)

Primary Examiner—D. S Nakarani
(74) Attorney, Agent, or Firm—Westerman, Hattori, Daniels & Adrian, LLP

(57) ABSTRACT

An optical film containing a polymer having at least a repeating unit represented by following general formula (I):

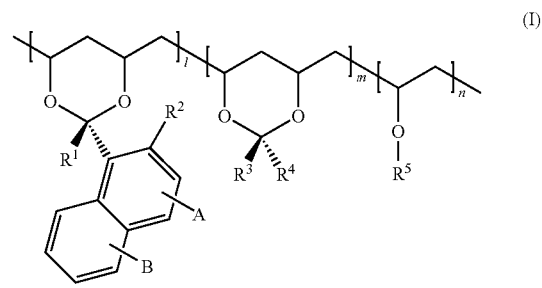

The optical film is excellent in heat resistance, transparency and processability because it contains a polymer having a naphthyl group in a molecular structure. In addition, when a retardation film is produced by drawing the optical film, a composition ratio of the polymer can be adjusted in a specific range so that the retardation film exhibits inverse wavelength dispersion properties such that higher retardation value is offered in measuring by light with longer wavelength. The retardation film having such properties is extremely useful for improving display properties of a liquid crystal display device. The optical film is also used in the production of a polarizing plate.

17 Claims, 3 Drawing Sheets

U.S. PATENT DOCUMENTS

| | | | |
|---|---|---|---|
| 6,555,617 | B1 | 4/2003 | Tanaka et al. |
| 7,501,165 | B2 * | 3/2009 | Ohmori et al. ............... 428/1.3 |
| 2003/0130435 | A1 | 7/2003 | Tanaka et al. |

OTHER PUBLICATIONS

Chinese Office Action dated Jun. 19, 2009, issued in corresponding Chinese Patent Application No. 2006800414439.

* cited by examiner

OPTICAL FILM CONTAINING POLYMER HAVING NAPHTYL GROUP

BACKGROUND OF THE INVENTION

1. Field of the Invention

The present invention relates to an optical film containing a new polymer having a naphthyl group.

2. Description of the Related Art

A liquid crystal display device (hereinafter referred to as LCD) is an element for displaying characters and images by utilizing electrooptical properties of a liquid crystal molecule, and spreads widely in portable telephones, notebook computers and liquid crystal televisions. However, LCD utilizes a liquid crystal molecule having optical anisotropy, so that there is a problem that excellent display properties are exhibited in one direction, while a screen becomes dark and unclear in other directions. A retardation film is widely adopted for LCD to solve such a problem. One retardation film has conventionally been developed, which has properties (also called inverse wavelength dispersion properties) such that higher retardation value is offered in measuring by light with longer wavelength (see Japanese Unexamined Patent Publication No. 2002-221622). However, a conventional retardation film exhibiting inverse wavelength dispersion properties is as high as 200° C. or more in glass transition temperature and very fragile, so that processability such as drawing is poor. Also, there is room for improving wavelength dispersion properties of a retardation film. Thus, the solution of the problems has been desired.

SUMMARY OF THE INVENTION

The present invention has been made to solve such problems, and the object thereof is to provide an optical film excellent in transparency, heat resistance and processability.

Through earnest studies for solving the above-mentioned problems, the inventors of the present invention have completed the present invention by finding out that an optical film described below allows the above-mentioned object to be achieved.

An optical film of the present invention contains a polymer having at least a repeating unit represented by following general formula (I).

[Chemical Formula 1]

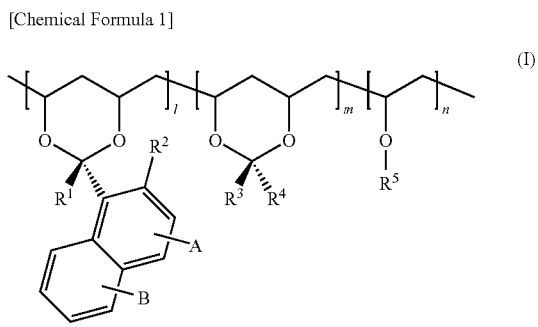

In the general formula (I), $R^1$, A and B denote a hydrogen atom; $R^3$ denotes a hydrogen atom, or a straight-chain or branched alkyl group with a carbon number of 1 to 4; $R^2$ denotes a halogen atom, a straight-chain or branched alkyl group with a carbon number of 1 to 4, a straight-chain or branched alkyl halide group with a carbon number of 1 to 4, a straight-chain or branched alkoxy group with a carbon number of 1 to 4, an alkoxycarbonyl group, an acyloxy group, an amino group, an azide group, a nitro group, a cyano group or a hydroxyl group; $R^4$ denotes straight-chain or branched alkyl group with a carbon number of 1 to 4, a substituted or unsubstituted cycloalkyl group with a carbon number of 5 to 10, a substituted or unsubstituted phenyl group, or a substituted or unsubstituted naphthyl group; $R^5$ denotes a hydrogen atom, a straight-chain or branched alkyl group with a carbon number of 1 to 4, a benzyl group, a silyl group, a phosphoric acid group, an acyl group, a benzoyl group or a sulfonyl group; l, m and n denote an integer of 2 or more.

In a preferable embodiment, $R^3$ of the above-mentioned polymer is hydrogen atoms.

In a preferable embodiment, $R^2$ of the above-mentioned polymer is a methoxy group.

In a preferable embodiment, $R^4$ of the above-mentioned polymer is a straight-chain or branched alkyl group with a carbon number of 1 to 4.

In a preferable embodiment, a ratio; l/m (mol/mol) of l and m of the above-mentioned polymer is 0.10 to 0.50.

In a preferable embodiment, $R^5$ of the above-mentioned polymer is a hydrogen atom, a trimethylsilyl group, a triethylsilyl group or a tert-butylsilyl group.

In a preferable embodiment, a glass transition temperature of the above-mentioned polymer is 90 to 190° C.

In a preferable embodiment, the above-mentioned optical film has a thickness of 10 to 300 μm.

According to another aspect of the present invention, a retardation film is provided. This retardation film is obtained by orienting the above-mentioned optical film.

In a preferable embodiment, an in-plane birefringence (Δn [550]) of the above-mentioned retardation film at a temperature of 23° C., measured by light with a wavelength of 550 nm, is 0.001 to 0.1.

In a preferable embodiment, an in-plane retardation value (Re[550]) of the above-mentioned retardation film at a temperature of 23° C., measured by light with a wavelength of 550 nm, is 50 to 500 nm.

In a preferable embodiment, an in-plane retardation value (Re[550]) of the above-mentioned retardation film measured by light with a wavelength of 550 nm is larger at a temperature of 23° C. than an in-plane retardation value (Re[450]) of the above-mentioned retardation film measured by light with a wavelength of 450 nm.

In a preferable embodiment, an in-plane retardation value (Re[550]) of the above-mentioned retardation film measured by light with a wavelength of 550 nm is smaller at a temperature of 23° C. than an in-plane retardation value (Re[650]) of the above-mentioned retardation film measured by light with a wavelength of 650 nm.

According to another aspect of the present invention, a polarizing plate is provided. This polarizing plate has at least the above-mentioned optical film and a polarizer.

In a preferable embodiment, an absorption axis direction of the above-mentioned polarizer and a phase slow axis direction of the above-mentioned retardation film are substantially parallel or substantially orthogonal.

In a preferable embodiment, an absorption axis direction of the above-mentioned polarizer and a phase slow axis direction of the above-mentioned retardation film are substantially 45°.

An optical film of the present invention is excellent in heat resistance, transparency and processability by reason of containing a polymer having a naphthyl group in a molecular structure. In addition, a retardation film produced by drawing the above-mentioned optical film exhibits properties (inverse wavelength dispersion properties), such that higher retardation value is offered in measuring by light with longer wavelength, by adjusting composition ratio of the above-mentioned polymer in a specific range. A retardation film having such properties is extremely useful for improving display properties of a liquid crystal display device.

DETAILED DESCRIPTION OF THE PREFERRED EMBODIMENTS

1. Optical Film

Figure 1A:
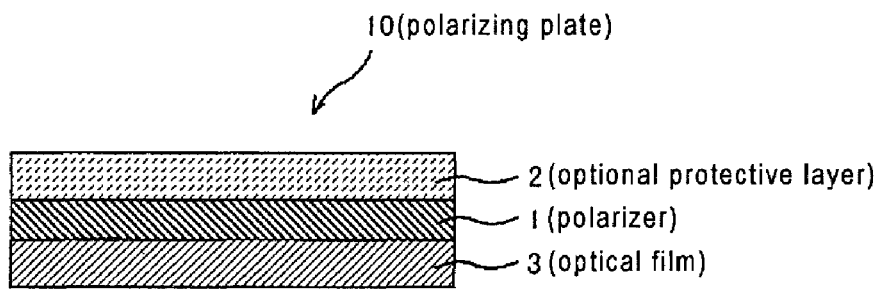
FIG. 1 (FIGS. 1A and 1B) is a schematic cross-sectional view of a polarizing plate employing an optical film in a preferable embodiment of the present invention.

An optical film of the present invention contains a polymer having at least a repeating unit represented by following general formula (I). The above-mentioned polymer is excellent in transparency, heat resistance and processability by reason of having a naphthyl group in a molecular structure.

[Chemical Formula 2]

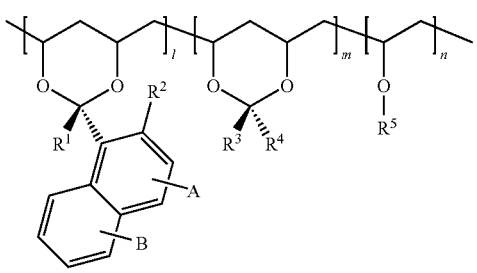

(I)

The above-mentioned polymer can be obtained, for example, by subjecting at least two kinds of aldehyde compounds and/or ketone compounds, and polyvinyl alcohol resin to condensation reaction. In the polymer represented by the general formula (I), the sequence of each of the base units l, m and n is not particularly limited but may be any of alternating, random and block. In the present specification, the polymer includes a polymer (the so-called high polymer) such that the total of polymerization degree of the base units l, m and n is 20 or more and weight-average molecular weight is large as well as a low polymer (the so-called oligomer) such that the total of polymerization degree of the base units l, m and n is 2 or more and less than 20 and weight-average molecular weight is approximately several thousands.

In the general formula (I), $R^1$ and $R^3$ each independently denote a hydrogen atom, a straight-chain or branched alkyl group with a carbon number of 1 to 4, or a substituted or unsubstituted phenyl group. In condensation reaction of polyvinyl alcohol resin, a hydrogen atom is introduced into $R^1$ in the case of using aldehyde compounds, while a substituent except a hydrogen atom is introduced into $R^1$ in the case of using ketone compounds. $R^1$ and $R^3$ are preferably hydrogen atoms. That is, the polymer preferably has at least a repeating unit represented by the following general formula (II).

[Chemical Formula 3]

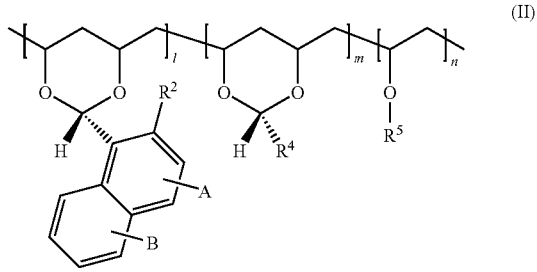

(II)

$R^2$, A and B each independently denote a hydrogen atom, a halogen atom, a straight-chain or branched alkyl group with a carbon number of 1 to 4, a straight-chain or branched alkyl halide group with a carbon number of 1 to 4, a straight-chain or branched alkoxy group with a carbon number of 1 to 4, an alkoxycarbonyl group, an acyloxy group, an amino group, an azide group, a nitro group, a cyano group or a hydroxyl group (however, $R^2$ is not a hydrogen atom). $R^2$ is a substituent substituted in 2-position of a naphthyl ring, and A is a substituent substituted in 3-position or 4-position of a naphthyl ring. B is a substituent substituted in 5-position to 8-position of a naphthyl ring. $R^2$ is preferably a methoxy group. A and B are preferably hydrogen atoms.

$R^2$ is used for controlling steric conformation of a naphthyl ring to which the substituent is bonded. More specifically, it is assumed that the substituent easily conforms by steric hindrance between two oxygen atoms in the general formula (I). Then, the planar structure of the naphthyl ring is oriented substantially orthogonally to an imaginary line connecting the two oxygen atoms. The use of such a polymer allows an optical film excellent in transparency, heat resistance and processability.

In the general formula (I), the base unit; l can be obtained, for example, by condensation reaction with polyvinyl alcohol resin and 1-naphthaldehydes or 1-naphthones. The 1-naphthaldehydes can be adopted properly and appropriately. Examples of the 1-naphthaldehydes include 2-methoxy-1-naphthaldehyde, 2-ethoxy-1-naphthaldehyde, 2-propoxy-1-naphthaldehyde, 2-methyl-1-naphthaldehyde and 2-hydroxy-1-naphthaldehyde. The 1-naphthones can be adopted properly and appropriately. Examples of the 1-naphthones include 2-hydroxy-1-acetonaphthone and 8'-hydroxy-1'-benzonaphthone. Among these, 2-methoxy-1-naphthaldehyde is preferable (in this case in the general formula (I), $R^2$ is a methoxy group, and A and B are hydrogen atoms).

The above-mentioned 1-naphthaldehydes can be obtained by an optional appropriate synthesis method. Examples of a synthesis method of the 1-naphthaldehydes include a method of reacting substituted or unsubstituted naphthoic acid with optional alcohol to obtain substituted or unsubstituted naphthoate, which is thereafter reduced with reducing agents such as diisobutylaluminum hydride and hydrogenated bis(2-methoxyethoxy)aluminum sodium, as described in Japanese Unexamined Patent Publication Nos. 9-040600 and 9-110775. Commercially available articles can also be used directly for the 1-naphthaldehydes. Commercial 1-naphthaldehydes are available from AIR WATER CHEMICAL INC. and Daiwa Kasei K.K., for example.

The above-mentioned 1-naphthones can be obtained by an optional appropriate synthesis method. Examples of a synthesis method of the 1-naphthones include a method of reacting substituted or unsubstituted naphthoic acid with appropriate phosphoric halide and thionyl chloride to obtain an acyl halide, which is thereafter further reacted with an appropriate nucleophilic reagent. Alternatively, a method described in Reference Example 1 of Japanese Patent No. 2846418 can also be used.

$R^4$ denotes a hydrogen atom, a straight-chain or branched alkyl group with a carbon number of 1 to 4, a substituted or unsubstituted cycloalkyl group with a carbon number of 5 to 10, a substituted or unsubstituted phenyl group, a substituted or unsubstituted naphthyl group, or a substituted or unsubstituted heterocyclic group. A polymer such that such a substituent is introduced into $R^4$ is excellent in solubility in all-purpose solvent (such as acetone, ethyl acetate and toluene). $R^4$ is preferably a straight-chain or branched alkyl group with a carbon number of 1 to 4.

In the general formula (I), the base unit; m can be obtained, for example, by condensation reaction of polyvinyl alcohol resin and optional aldehyde compounds or ketone compounds. Examples of the aldehyde compounds include formaldehyde, acetaldehyde, 1,1-diethoxyethane (acetal), propionaldehyde, n-butyraldehyde, isobutyraldehyde, cyclohexane carboxyaldehyde, 5-norbornene-2-carboxyaldehyde, 3-cyclohexene-1-carboxyaldehyde, dimethyl-3-cyclohexene-1-carboxyaldehyde, benzaldehyde, 2-chlorobenzaldehyde, para-dimethylaminobenzaldehyde, tert-butylbenzaldehyde, 3,4-dimethoxybenzaldehyde, 2-nitrobenzaldehyde, 4-cyanobenzaldehyde, 4-carboxybenzaldehyde, 4-phenylbenzaldehyde, 4-fluorobenzaldehyde, 2-(trifluoromethyl)benzaldehyde, 1-naphthaldehyde, 2-naphthaldehyde, 6-methoxy-2-naphthaldehyde, 3-methyl-2-thiophenecarboxyaldehyde, 2-pyridinecarboxyaldehyde and indole-3-carboxyaldehyde.

Examples of the ketone compounds include acetone, ethyl methyl ketone, diethyl ketone, tert-butyl ketone, dipropyl ketone, allyl ethyl ketone, acetophenone, para-methylacetophenone, 4'-aminoacetophenone, para-chloroacetophenone, 4'-methoxyacetophenone, 2'-hydroxyacetophenone, 3'-nitroacetophenone, P-(1-piperidino)acetophenone, benzalacetophenone, propiophenone, benzophenone, 4-nitrobenzophenone, 2-methylbenzophenone, para-bromobenzophenone, cyclohexyl(phenyl)methanone, 2-butyronaphthone and 1-acetonaphthone.

In the general formula (I), ratios of the base units; l and m can be properly set at appropriate values depending on the purpose. The ratio of the base unit; l is preferably 5 to 40 mol %, more preferably 5 to 30 mol % and particularly preferably 10 to 20 mol %. The ratio of the base unit; m is preferably 20 to 80 mol %, more preferably 40 to 75 mol % and particularly preferably 50 to 75 mol %.

The ratio; l/m (mol/mol) of the base units; l and m of the above-mentioned polymer is preferably 0.10 to 0.50, more preferably 0.12 to 0.40 and particularly preferably 0.15 to 0.40. The setting of the ratios of the base units; l and m in the above-mentioned ranges allows a retardation film containing the polymer to exhibit properties (the so-called inverse wavelength dispersion properties), such that higher retardation is offered in measuring by light with longer wavelength. With regard to a retardation film exhibiting such properties, the number of retardation films, which have conventionally been necessary for obtaining a circularly polarizing plate excellent in the properties, can be decreased from two sheets to one sheet, for example.

$R^5$ denotes a hydrogen atom, a straight-chain or branched alkyl group with a carbon number of 1 to 4, a benzyl group, a silyl group, a phosphoric acid group, an acyl group, a benzoyl group or a sulfonyl group.

$R^5$ is used for adjusting coefficient of water absorption to an appropriate value by protecting a remaining hydroxyl group (also referred to as end cap treatment). For example, in the case of using the above-mentioned polymer as a retardation film, lower coefficient of water absorption allows a retardation film having high transparency, excellent in stability of retardation. The substituent may not be subject to end cap treatment (that is, $R^5$ may be a hydrogen atom), depending on use and purpose for the polymer of the present invention. Examples of $R^5$ to be used include an optional appropriate group (typically, a protecting group) capable of forming a substituent by reacting with a hydroxyl group after obtaining a polymer with the hydroxyl group remaining (that is, capable of end cap treatment).

Examples of the above-mentioned protecting group include benzyl group, 4-methoxyphenylmethyl group, methoxymethyl group, trimethylsilyl group, triethylsilyl group, tert-butyldimethylsilyl group, acetyl group, benzoyl group, methanesulfonyl group and bis-4-nitrophenyl phosphite. $R^5$ is preferably trimethylsilyl group, triethylsilyl group or tert-butyldimethylsilyl group. The use of these substituents (protecting groups) allows a retardation film having high transparency, excellent in stability of retardation even under an environment of high temperature and high humidity.

The reaction conditions of the above-mentioned end cap treatment can adopt proper and appropriate conditions in accordance with kinds of substituents reacted with the hydroxyl group. Reactions such as alkylation, benzylation, sililation, phosphorylation and sulfonylation can be performed by stirring a polymer with the hydroxyl group remaining and a chloride of an intended substituent in the presence of a catalyst such as 4(N,N-dimethylamino)pyridine at a temperature of 25 to 100° C. for 1 to 20 hours.

In the general formula (I), ratio of the base unit; n can be properly set at an appropriate value depending on the purpose. The ratio of the base unit; n is preferably 1 to 60 mol %, more preferably 5 to 50 mol %, particularly preferably 10 to 40 mol % and most preferably 10 to 25 mol %. The setting of the ratio of the base unit; n in the above-mentioned range allows a retardation film further excellent in transparency and stability of retardation under an environment of high temperature and high humidity.

In one embodiment, an optical film of the present invention contains a polymer having at least a repeating unit represented by the following general formula (III). In the general formula (III), the base unit; o can be obtained, for example, by introducing a substituted or unsubstituted benzaldehyde into a polymer. The use of such a polymer allows an optical film further excellent in transparency and heat resistance.

[Chemical Formula 4]

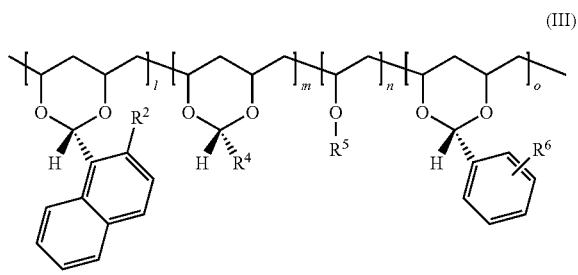

(III)

In the general formula (III), $R^2$, $R^4$ and $R^5$ are the same as described in the above. $R^6$ denotes a hydrogen atom, a halogen atom, a straight-chain or branched alkyl group with a carbon number of 1 to 4, a straight-chain or branched alkyl halide group with a carbon number of 1 to 4, a straight-chain or branched alkoxy group with a carbon number of 1 to 4, an alkoxycarbonyl group, an acyloxy group, an amino group, a nitro group, a cyano group or a hydroxyl group. $R^6$ is a substituent substituted in ortho-position, meta-position or para-position of a benzene ring.

In the general formula (III), ratios of the base units; l, m, n and o can be selected at appropriate values depending on the purpose. The ratio of the base unit; l is preferably 1 to 20 mol %, more preferably 5 to 15 mol %. The ratio of the base unit; m is preferably 25 to 50 mol %, more preferably 30 to 50 mol %. The ratio of the base unit; n is preferably 10 to 55 mol %, more preferably 15 to 50 mol %. The ratio of the base unit; o is preferably 1 to 20 mol %, more preferably 5 to 15 mol %.

In addition, the ratio [l/(m+o)] (mol/mol) of the base unit l to the total of the base units m and o is preferably 0.10 to 0.50, more preferably 0.12 to 0.40 and particularly preferably 0.15 to 0.30. The setting of the ratios of the base units; l, m, n and o in the above-mentioned ranges allows a retardation film containing the above-mentioned polymer to exhibit excellent properties such as to have transparency, heat resistance, development of retardation and inverse wavelength dispersion properties together.

In another embodiment, an optical film of the present invention contains a polymer having at least a repeating unit represented by the following general formula (IV). In the general formula (IV), the base unit; p can be obtained, for example, by introducing an ethylene-vinylalcohol copolymer into a polymer. The use of such a polymer allows an optical film further excellent in transparency and heat resistance. In the formula, $R^2$, $R^4$ and $R^5$ are the same as described in the above.

[Chemical Formula 5]

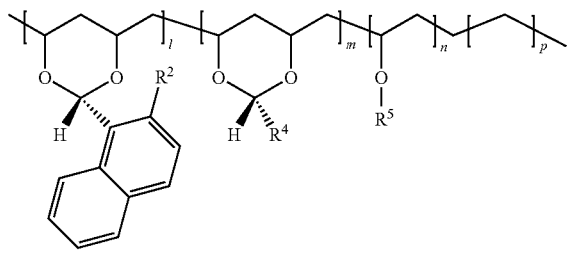

(IV)

In the general formula (IV), ratios of the base units; l, m, n and p can be selected at appropriate values depending on the purpose. The ratio of the base unit; l is preferably 5 to 25 mol %, more preferably 8 to 20 mol %. The ratio of the base unit; m is preferably 35 to 60 mol %, more preferably 40 to 55 mol %. The ratio of the base unit; n is preferably 10 to 40 mol %, more preferably 15 to 35 mol %. The ratio of the base unit; p is preferably 2 to 25 mol %, more preferably 5 to 20 mol %.

In addition, the ratio [l/(m+p)] (mol/mol) of the base unit l to the total of the base units m and p is preferably 0.08 to 0.40, more preferably 0.10 to 0.35 and particularly preferably 0.12 to 0.30. The setting of the ratios of the base units; l, m, n and p in the above-mentioned ranges allows a retardation film containing the above-mentioned polymer to exhibit excellent properties such as to have transparency, stability of retardation, development of retardation and inverse wavelength dispersion properties together.

In a further embodiment, an optical film of the present invention contains a polymer having at least a repeating unit represented by the following general formula (V). In the general formula (V), the base unit; q can be obtained, for example, by introducing substituted or unsubstituted 2-naphthaldehyde into a polymer. The use of such a polymer allows an optical film further excellent in transparency and heat resistance.

[Chemical Formula 6]

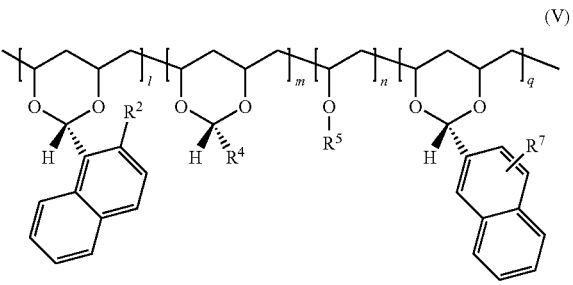

(V)

In the general formula (V), $R^2$, $R^4$ and $R^5$ are the same as described in the above. $R^7$ denotes a hydrogen atom, a halogen atom, a straight-chain or branched alkyl group with a carbon number of 1 to 4, a straight-chain or branched alkyl halide group with a carbon number of 1 to 4, a straight-chain or branched alkoxy group with a carbon number of 1 to 4, an alkoxycarbonyl group, an acyloxy group, an amino group, a nitro group, a cyano group or a hydroxyl group. $R^7$ is a substituent substituted in any of 1-position or 3-position to 8-position. A naphthyl group substituted in the base unit; q is preferably a hydrogen atom in 1-position and 3-position thereof.

In the general formula (V), ratios of the base units; l, m, n and q can be selected at appropriate values depending on the purpose. The ratio of the base unit; l is preferably 1 to 20 mol %, more preferably 5 to 15 mol %. The ratio of the base unit; m is preferably 20 to 55 mol %, more preferably 25 to 50 mol %. The ratio of the base unit; n is preferably 10 to 65 mol %, more preferably 15 to 60 mol %. The ratio of the base unit; q is preferably 1 to 15 mol %, more preferably 5 to 10 mol %.

In addition, the ratio [l/(m+q)] (mol/mol) of the base unit l to the total of the base units m and q is preferably 0.10 to 0.50, more preferably 0.12 to 0.40 and particularly preferably 0.15 to 0.30. The setting of the ratios of the base units; l, m, n and q in the above-mentioned ranges allows a retardation film containing the above-mentioned polymer to exhibit excellent properties such as to have transparency, heat resistance, stability of retardation and inverse wavelength dispersion properties together.

In a further embodiment, an optical film of the present invention contains a polymer having at least a repeating unit represented by the following general formula (VI). In the general formula (VI), the base unit; r can be obtained, for example, by introducing substituted or unsubstituted cyclohexane carboxyaldehyde into a polymer. The use of such a polymer allows an optical film further excellent in transparency and heat resistance.

[Chemical Formula 7]

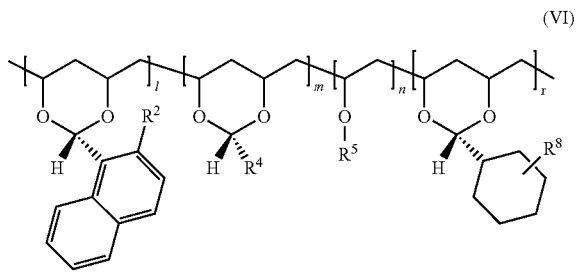

(VI)

In the general formula (VI), $R^2$, $R^4$ and $R^5$ are the same as described in the above. $R^8$ denotes a hydrogen atom, a halogen atom, a straight-chain or branched alkyl group with a carbon number of 1 to 4, a straight-chain or branched alkyl halide group with a carbon number of 1 to 4, a straight-chain or branched alkoxy group with a carbon number of 1 to 4, an alkoxycarbonyl group, an acyloxy group, an amino group, a nitro group, a cyano group or a hydroxyl group. $R^8$ is a substituent substituted in any of 2-position to 6-position.

In the general formula (VI), ratios of the base units; l, m, n and r can be selected at appropriate values depending on the purpose. The ratio of the base unit; l is preferably 2 to 20 mol %, more preferably 5 to 15 mol %. The ratio of the base unit; m is preferably 15 to 40 mol %, more preferably 20 to 35 mol %. The ratio of the base unit; n is preferably 5 to 50 mol %, more preferably 10 to 45 mol %. The ratio of the base unit; r is preferably 10 to 35 mol %, more preferably 15 to 30 mol %.

In addition, the ratio [l/(m+r)] (mol/mol) of the base unit l to the total of the base units m and r is preferably 0.12 to 0.50, more preferably 0.15 to 0.40 and particularly preferably 0.18 to 0.35. The setting of the ratios of the base units; l, m, n and r in the above-mentioned ranges allows a retardation film containing the above-mentioned polymer to exhibit excellent properties such as to have transparency, heat resistance, stability of retardation and inverse wavelength dispersion properties together.

The weight-average molecular weight of the above-mentioned polymer is preferably 1,000 to 1,000,000, more preferably 3,000 to 500,000 and particularly preferably 5,000 to 300,000. The setting of the weight-average molecular weight in the above-mentioned range allows an optical film excellent in mechanical strength. The weight-average molecular weight can be calculated by the gel permeation chromatography (GPC) method through polystyrene as a standard sample. An analysis device to be used can be 'HLC-8120GPC' manufactured by TOSOH CORPORATION (column: TSK gel Super HM-H/H4000/H3000/H2000, column size: 6.0 mmI.D.×150 mm each, eluant: tetrahydrofuran, flow rate: 0.6 ml/min, detector: RI, column temperature: 40° C., injection volume: 20 μl).

The glass transition temperature of the above-mentioned polymer is preferably 90 to 190° C., more preferably 100 to 170° C. and particularly preferably 110 to 150° C. The setting of the glass transition temperature in the above-mentioned range allows an optical film excellent in heat resistance. The glass transition temperature can be measured by the DSC method in accordance with JIS K 7121 (1987).

An optical film containing the above-mentioned polymer can further contain optional appropriate addition agents. Examples of the addition agents include plasticizer, heat stabilizer, light stabilizer, lubricant, antioxidant, ultraviolet absorbing agent, flame retardant, antistatic agent, compatibilizer, crosslinking agent and thickener. The used amount of the addition agents can be selected at an appropriate value depending on the purpose. The used amount of the addition agents is preferably more than 0 and 10 (weight ratio) or less, more preferably more than 0 and 5 (weight ratio) or less with respect to 100 parts by weight of the polymer.

The thickness of the above-mentioned optical film can be properly set at an appropriate value depending on the purpose. The thickness is preferably 10 to 300 μm, more preferably 20 to 200 μm and particularly preferably 30 to 150 μm. The above-mentioned range allows an optical film excellent in mechanical strength and thickness uniformity.

The transmittance of the above-mentioned optical film at a wavelength of 550 nm is preferably 85% or more, more preferably 90% or more.

The absolute value $(C[550](m^2/N))$ of photoelastic coefficient of the above-mentioned optical film is preferably $1\times10^{-12}$ to $80\times10^{-12}$, more preferably $1\times10^{-12}$ to $50\times10^{-12}$ and particularly preferably $1\times10^{-12}$ to $30\times10^{-12}$. The use of the optical film with the absolute value of photoelastic coefficient in the above-mentioned range allows a liquid crystal display device excellent in display uniformity, for example.

The coefficient of water absorption of the above-mentioned optical film is preferably 7% or less, more preferably 5% or less and particularly preferably 3% or less. The setting of the coefficient of water absorption in the above-mentioned range allows a retardation film excellent in stability of retardation even under an environment of high temperature and high humidity, for example.

2. Producing Method for Optical Film

In one embodiment, a polymer used for the present invention is produced by a method comprising the step of reacting polyvinyl alcohol resin and two kinds or more of aldehyde compounds and/or ketone compounds in the presence of an acid catalyst while dispersed or dissolved in solvent. This reaction is condensation reaction with polyvinyl alcohol resin, and also called acetalization in the case of using aldehyde compounds or ketalization in the case of using ketone compounds.

The above-mentioned polyvinyl alcohol resin can properly adopt an appropriate resin depending on the purpose. The resin may be a straight-chain polymer or a branched polymer. Also, the resin may be a homopolymer or a copolymer polymerized from two kinds or more of monomers. In the case where the resin is a copolymer, the sequence of base units may be any of alternating, random and block. Typical examples of a copolymer include an ethylene-vinylalcohol copolymer.

The above-mentioned polyvinyl alcohol resin can be obtained, for example, in such a manner that a vinyl ester monomer is polymerized into a vinyl ester polymer, which is thereafter saponified to make a vinyl ester unit into a vinyl alcohol unit. Examples of the vinyl ester monomer include vinyl formate, vinyl acetate, vinyl propionate, vinyl valerate, vinyl laurate, vinyl stearate, vinyl benzoate, vinyl pivalate and vinyl ester of versatic acid. Among these vinyl ester monomers, vinyl acetate is particularly preferable.

The saponification degree of the above-mentioned polyvinyl alcohol resin is typically 70 mol % or more, preferably 80 mol % or more, particularly preferably 95 mol % or more and most preferably 98 mol % or more. The saponification degree can be measured in accordance with JIS K 6727 (1994). The setting of the saponification degree in the above-mentioned range allows a polymer excellent in durability.

Commercially available articles can be used directly for the above-mentioned polyvinyl alcohol resin. Alternatively, articles such that optional appropriate polymer denaturation is performed for commercial resin can be used. Examples of commercial polyvinyl alcohol resin include POVAL series manufactured by Kuraray Co., Ltd. (trade names "PVA-103, PVA-117, PVA-613, PVA-220, PVA-405 etc."), EXCEVAL series manufactured by Kuraray Co., Ltd. (trade names "RS-4104, RS-3110, RS-1717 etc."), EVAL series manufactured by Kuraray Co., Ltd. (trade names "L101, F101, H101, E105, G156 etc."), GOHSENOL series manufactured by Nippon Synthetic Chemical Industry Co., Ltd. (trade names "NH-18, NH-300, A-300, C-500, GM-14 etc.") and SOARNOL series manufactured by Nippon Synthetic Chemical Industry Co., Ltd. (trade names "D2908, DT2903, DC3203 etc.").

The average degree of polymerization of the above-mentioned polyvinyl alcohol resin can be set at an optional appropriate value. The average degree of polymerization is preferably 400 to 5000, more preferably 800 to 4000 and particularly preferably 800 to 3000. The average degree of polymerization of the polyvinyl alcohol resin can be measured by a method in accordance with JIS K 6726 (1994).

With regard to the above-mentioned polyvinyl alcohol resin, viscosity (mPa·s) at a temperature of 20° C. in the case of 4% by weight-aqueous solution thereof is preferably 2 to 70, more preferably 10 to 50 and particularly preferably 20 to 40. The use of the resin with the viscosity allows a polymer excellent in strength and processability.

The production of the above-mentioned polymer preferably comprises the step of drying the polyvinyl alcohol resin before condensation reaction. The drying temperature is preferably 30 to 150° C., more preferably 70 to 130° C. The drying time is preferably 10 minutes or more, more preferably 30 minutes or more. The adoption of the drying conditions allows a polymer with high degree of acetalization.

As the above-mentioned solvent, an appropriate solvent can be properly selected depending on the purpose. Examples of the solvent include alcohols such as methanol, ethanol, propanol and butanol, cyclic ethers such as 1,4-dioxane, and aprotic solvents such as N,N-dimethylformaldehyde, N-methylpyrrolidone and dimethyl sulfoxide. These solvents are used singly or by mixture of two kinds or more. The solvent may be used by mixture with water.

As the above-mentioned acid catalyst, an appropriate catalyst can be properly selected depending on the purpose. Examples of the acid catalyst include hydrochloric acid, sulfuric acid, phosphoric acid and para-toluenesulfonic acid. The acid catalyst is preferably para-toluenesulfonic acid.

The temperature for reacting the above-mentioned acid catalyst is typically higher than 0° C. and the boiling point or less of solvent to be used, preferably 10 to 100° C., and more preferably 20 to 80° C. The reaction time is preferably 30 minutes to 20 hours, more preferably 1 to 10 hours. The adoption of the reaction conditions allows a polymer having high degree of acetalization in high yield.

The degree of acetalization of the above-mentioned polymer is preferably 40 to 99 mol %, more preferably 50 to 95 mol % and particularly preferably 60 to 90 mol %. The setting of the degree of acetalization in the above-mentioned range allows a polymer further excellent in transparency, heat resistance and molding processability.

An optical film containing the above-mentioned polymer can be obtained by an optional appropriate molding processing method. Examples of the molding processing method include a compression molding method, a transfer molding method, an injection molding method, an extrusion molding method, a blow molding method, a powder molding method, an FRP molding method and a solvent casting method. The molding processing method is preferably a solvent casting method or an extrusion molding method. The solvent casting method is specifically a method such that concentrated solution (dope) in which a composition containing a polymer as the main component and an addition agent is dissolved in solvent is defoamed and cast in the form of a sheet on the surface of an endless stainless belt or a rotating drum to mold a film by vaporizing the solvent. The extrusion molding method is specifically a method such that a composition containing a polymer as the main component and an addition agent is heated and melted and then extruded in the form of a sheet on the surface of a casting roll by using a T die or the like to form a film by cooling. The adoption of the above-mentioned methods allows an optical film excellent in thickness uniformity.

3. Use of Optical Film

An optical film of the present invention can be used for optional appropriate uses. Examples of typical uses include a retardation film, a protective film of polarizer, a separate film of pressure-sensitive adhesive (release liner), a surface protective sheet, a prism sheet, a diffuser panel, light guide panel, an oriented film, an antireflection film, an electromagnetic-wave cut filter, an ultraviolet-absorbing film, a near infrared ray-absorbing film and a transparent conductive film.

4. Retardation Film

A retardation film of the present invention is obtained by orienting the above-mentioned optical film. In the present specification, a retardation film signifies such as to have birefringence in the plane and/or the thickness direction.

An in-plane birefringence ($\Delta n[550]$) of the above-mentioned retardation film at a temperature of 23° C., which are measured by light with a wavelength of 550 nm, is $1 \times 10^{-4}$ or more, preferably 0.001 to 0.01, more preferably 0.0015 to 0.008, particularly preferably 0.002 to 0.006 and most preferably 0.002 to 0.004. For example, the retardation film is excellent in stretchability, so that the $\Delta n[550]$ can be adjusted in a wide rage by a draw ratio.

In the present specification, Re[550] signifies an in-plane retardation value at a temperature of 23° C., which is measured by light with a wavelength of 550 nm. Re[550] can be calculated by expression: $Re[550]=(n_x-n_y) \times d$ when the refractive indexes of a retardation film at a wavelength of 550 nm in the phase slow axis direction and the phase fast axis direction are regarded as $n_x$ and $n_y$, respectively, and d (nm) is regarded as the thickness of the retardation film. The phase slow axis signifies the direction in which the in-plane refractive index becomes the maximum.

Re[550] of the above-mentioned retardation film can be selected at an appropriate value depending on the purpose. The Re[550] is 10 nm or more, preferably 50 to 500 nm. For example, in the case where the retardation film is used as a λ/2 plate, the Re[550] is preferably 200 to 400 nm. Alternatively, in the case where the retardation film is used as a λ/4 plate, the Re[550] is preferably 100 to 200 nm.

With regard to the above-mentioned retardation film at a temperature of 23° C., an in-plane retardation value (Re [550]) measured by light with a wavelength of 550 nm is preferably larger than an in-plane retardation value (Re[450]) measured by light with a wavelength of 450 nm. With regard to the retardation film having such wavelength dispersion properties, a retardation value becomes constant in a blue region; for example, a phenomenon such that light leakage is caused depending on a viewing angle and a phenomenon such that a display image becomes bluish (also called bluish phenomenon) can be improved in the case of being used for a liquid crystal display device.

The ratio (Re[450]/Re[550]) of Re[450] to Re[550] of the above-mentioned retardation film is preferably smaller than 1, more preferably 0.50 to 0.99, particularly preferably 0.70 to 0.97 and most preferably 0.80 to 0.95. The setting of Re[450]/Re[550] in the above-mentioned range allows further excellent display properties, for example, in the case of using the retardation film for a liquid crystal display device.

In addition, the difference (Re[550]−Re[450]) between Re[550] and Re[450] of the above-mentioned retardation film is preferably 5 nm or more, more preferably 10 nm or more and particularly preferably 20 nm or more. A retardation film having large difference between Re[550] and Re[450] has conventionally been produced with difficulty; however, the retardation film of the present invention allows such a problem to be greatly improved. For example, Re[550]−Re[450] is ideally approximately 25 nm in the case where the retardation film is used for a λ/4 plate, and Re[550]−Re[450] is ideally approximately 50 nm in the case where the retardation film is used for a λ/2 plate.

With regard to the above-mentioned retardation film at a temperature of 23° C., an in-plane retardation value (Re [550]) measured by light with a wavelength of 550 nm is preferably smaller than an in-plane retardation value (Re [650]) measured by light with a wavelength of 650 nm. With regard to the retardation film having such wavelength dispersion properties, a retardation value becomes constant in a red region; for example, a phenomenon such that light leakage is caused depending on a viewing angle and a phenomenon such that a display image becomes reddish (also called reddish phenomenon) can be improved in the case of being used for a liquid crystal display device.

The ratio (Re[650]/Re[550]) of Re[650] to Re[550] of the above-mentioned retardation film is preferably larger than 1, more preferably 1.01 to 1.20, particularly preferably 1.02 to 1.15 and most preferably 1.03 to 1.10. The setting of Re[650]/Re[550] in the above-mentioned range allows further excellent display properties, for example, in the case of using the retardation film for a liquid crystal display device.

In addition, the difference (Re[550]−Re[650]) between Re[550] and Re[650] of the above-mentioned retardation film is preferably −5 nm or less, more preferably −10 nm or less, particularly preferably −15 nm or less and most preferably −20 nm or less. A retardation film having (negatively) large difference between Re[550] and Re[650] has conventionally been produced with difficulty; however, the retardation film of the present invention allows such a problem to be greatly improved. For example, Re[550]−Re[650] is ideally approximately −25 nm in the case where the retardation film is used for a λ/4 plate, and Re[550]−Re[650] is ideally approximately −50 nm in the case where the retardation film is used for a λ/2 plate.

In addition, the difference (Re[650]−Re[450]) between Re[650] and Re[450] of the retardation film is preferably 10 nm or more, more preferably 15 nm or more and particularly preferably 20 nm or more. With regard to the retardation film having such wavelength dispersion properties, a retardation value becomes constant in a wide region of visible light; for example, high contrast ratio and excellent color reproducibility can be obtained in the case of being used for a liquid crystal display device.

In the present specification, Rth[550] signifies a retardation value in the thickness direction at a temperature of 23° C., which is measured by light with a wavelength of 550 nm. Rth[550] can be calculated by expression: Rth[550]=(nx−nz)×d when the refractive indexes of a retardation film at a wavelength of 550 nm in the phase slow axis direction and the thickness direction are regarded as nx and nz, respectively, and d (nm) is regarded as the thickness of the retardation film. The phase slow axis signifies the direction in which the in-plane refractive index becomes the maximum.

Rth[550] of the above-mentioned retardation film can be selected at an appropriate value depending on the purpose. The Rth[550] is 10 nm or more, preferably 50 to 500 nm. For example, in the case where the retardation film is used as a λ/2 plate, the Rth[550] is preferably 200 to 400 nm. Alternatively, in the case where the retardation film is used as a λ/4 plate, the Rth[550] is preferably 100 to 200 nm.

Re[450], Re[550], Re[650] and Rth[550] can be measured by using "KOBRA21-ADH" trade name, manufactured by Oji Sceientific Instruments. With the use of an in-plane retardation value at a temperature of 23° C. and a wavelength of 550 nm (Re), a retardation value measured while inclining the phase slow axis as an inclined axis by 40 degrees (R40), the thickness of a retardation film (d) and the average refractive index of a retardation film (n0), nx, ny and nz can be calculated from the following expressions (i) to (iii) by computer numerical calculation, and subsequently Rth can be calculated by the following expression (iv). Here, φ and ny' are represented by the following expressions (v) and (vi), respectively.

$$Re=(nx-ny)\times d \qquad (i)$$

$$R40=(nx-ny')\times d/\cos(\phi) \qquad (ii)$$

$$(nx+ny+nz)/3=n0 \qquad (iii)$$

$$Rth=(nx-nz)\times d \qquad (iv)$$

$$\phi=\sin^{-1}[\sin(40°)/n0] \qquad (v)$$

$$ny'=ny\times nz/[ny^2\times\sin^2(\phi)+nz^2\times\cos^2(\phi)]^{1/2} \qquad (vi)$$

With regard to the above-mentioned retardation film, the rate of change of Re[550] in the case of storing in an air-circulating drying oven at a temperature of 80° C. for 100 hours is preferably 3% or less, more preferably 2% or less and particularly preferably 1.5% or less. The rate of change of Re[550] (%) can be calculated from the following expression: (Re[550] after 100 hours have passed/Re[550] before being introduced into the drying oven)×100.

5. Producing Method for Retardation Film

In one embodiment, a retardation film of the present invention is produced by orientating the above-mentioned optical film through drawing.

A method of drawing the above-mentioned optical film can adopt an optional appropriate drawing method depending on the purpose. Examples of the drawing method include a vertical uniaxial drawing method, a lateral uniaxial drawing method, a vertical and lateral simultaneous biaxial drawing method, and a vertical and lateral sequential biaxial drawing method. A means of drawing the optical film can employ optional appropriate drawing machines such as roll drawing machine, tenter drawing machine and biaxial drawing machine. The drawing machines are preferably provided with a temperature control means. In the case of drawing by heating, the internal temperature of the drawing machines may be changed continuously or gradually. The drawing process may be performed at one time, or divided into two times or more. The drawing direction may be the longitudinal direction (MD direction) or the width direction (TD direction) of the film. The drawing in the oblique direction (oblique drawing) may be performed by using the drawing method described in FIG. 1 of Japanese Unexamined Patent Publication No. 2003-262721.

The temperature for drawing the above-mentioned optical film (drawing temperature) can be selected at an appropriate value depending on the purpose. The drawing is preferably performed in a range of (Tg+1) to (Tg+30)° C. with respect to the glass transition temperature (Tg) of the optical film. The selection of such conditions allows a retardation value to easily become uniform, and the film to be crystallized (clouded) with difficulty. The drawing temperature is specifically 90 to 210° C., more preferably 100 to 200° C. and particularly preferably 100 to 180° C. The glass transition temperature can be measured by the DSC method in accordance with JIS K 7121(1987).

A means of controlling the above-mentioned drawing temperature can adopt an optional appropriate means. Examples of the temperature control means include an air-circulating constant temperature oven for circulating hot air or cold air, a heater utilizing microwaves or far infrared rays, a roll, a heat pipe roll and a metal belt heated for temperature regulation.

The magnification for drawing the above-mentioned optical film (draw ratio) can be properly selected depending on the purpose. The draw ratio is preferably more than 1 and 3 times or less, more preferably more than 1 and 2.5 times or less, and particularly preferably 1.1 to 2.0 times. The feed rate in drawing is not particularly restricted and yet preferably 0.5 to 30 m/minute, more preferably 1 to 20 m/minute in view of machine accuracy and stability. The drawing conditions allows not merely intended optical property but also a retardation film excellent in optical uniformity.

6. Use of Retardation Film

A retardation film of the present invention can be used for optional appropriate uses. Examples of typical uses include a λ/4 plate, a λ/2 plate and an optical compensation film of a liquid crystal display device. Other examples thereof include an antireflection film for flat panel displays such as a liquid crystal display device, an organic EL display and a plasma display.

7. Polarizing Plate

Figure 1B:
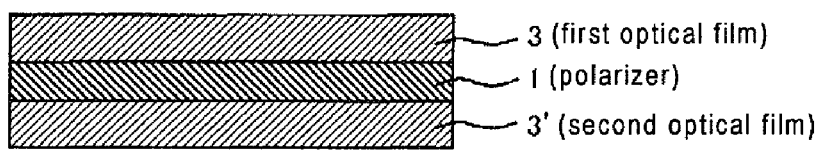

In one embodiment, a polarizing plate of the present invention has at least the above-mentioned optical film and polarizer. FIG. 1 is a schematic cross-sectional view of a polarizing plate employing the optical film in a preferable embodiment of the present invention. A polarizing plate in FIG. 1A is provided with an optional protective layer 2 on one side of a polarizer 1 and with an optical film 3 on the other side thereof. A polarizing plate in FIG. 1B is provided with the first optical film 3 on one side of the polarizer 1 and with a second optical film 3' on the other side thereof. The first optical film 3 and second optical film 3' may be the same or different. A polarizing plate of the present invention is not limited to the constitution; for example, an optional layer can be disposed between each of the component members.

Figure 2A:
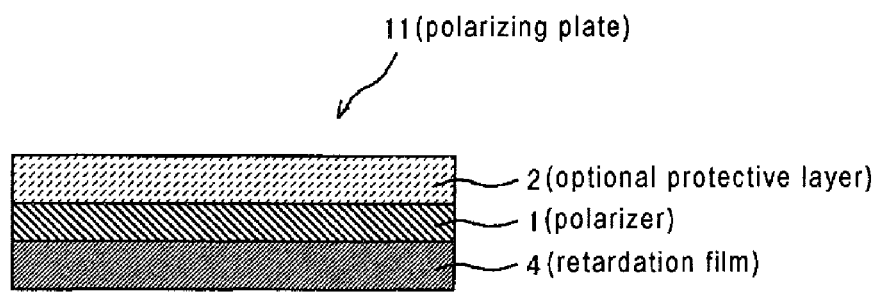
FIG. 2 (FIG. 2A to FIG. 2D) is a schematic cross-sectional view of a polarizing plate employing a retardation film in a preferable embodiment of the present invention.
Figure 2B:
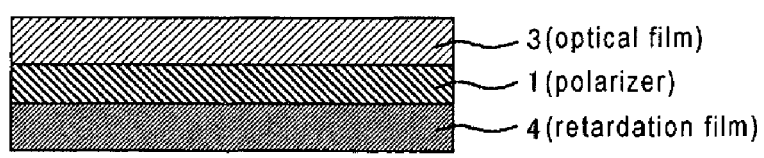
Figure 2C:
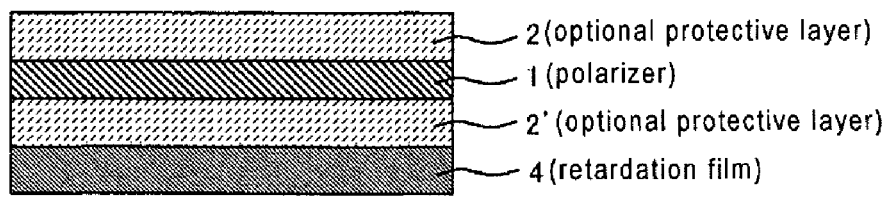
Figure 2D:
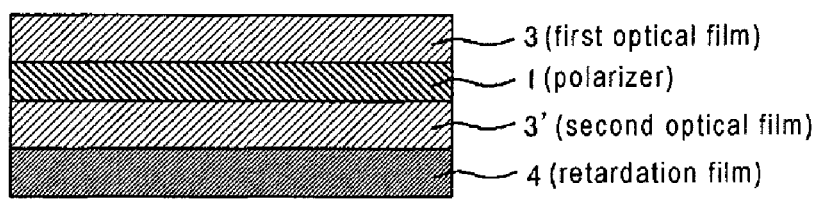

In another embodiment, a polarizing plate of the present invention has at least the above-mentioned retardation film and polarizer. FIG. 2 is a schematic cross-sectional view of a polarizing plate employing a retardation film in a preferable embodiment of the present invention. A polarizing plate in FIG. 2(A) is provided with an optional protective layer 2 on one side of a polarizer 1 and with a retardation film 4 on the other side thereof. A polarizing plate in FIG. 2(B) is provided with an optical film 3 on one side of the polarizer 1 and with the retardation film 4 on the other side thereof. A polarizing plate in FIG. 2(C) is provided with the optional protective layer 2 on one side of the polarizer 1 and with an optional protective layer 2' on the other side thereof and further with the retardation film 4 on the opposite side of the protective layer 2' to the side of the polarizer 1. A polarizing plate in FIG. 2(D) is provided with the optical films 3 and 3' on both sides of the polarizer 1 and further with the retardation film 4 on opposite side of the optical film 3' to the side of the polarizer 1. The optional protective layers 2 and 2' may be the same or different. The optical films 3 and 3' may be the same or different.

As an example of a polarizing plate of the present invention, with regard to the above-mentioned polarizing plate, the absorption axis direction of the polarizer and the phase slow axis direction of the retardation film are substantially parallel or substantially orthogonal. In the present specification, 'substantially parallel' includes the case where the angle between the absorption axis direction of the polarizer and the phase slow axis direction of the retardation film is 0°±2.0°, preferably 0°±1.0° and more preferably 0°±0.5°. 'Substantially orthogonal' includes the case where the angle between the absorption axis direction of the polarizer and the phase slow axis direction of the retardation film is 90°±2.0°, preferably 90°±1.0° and more preferably 90°±0.5°. According to such an embodiment, display properties of a liquid crystal display device is not affected by birefringence of the retardation film in the front direction, while a liquid crystal cell is optically compensated by birefringence of the retardation film in the oblique direction. As a result, a liquid crystal display device with high contrast ratio can be obtained in both the front direction and the oblique direction.

As an example of a polarizing plate of the present invention, with regard to the above-mentioned polarizing plate, the absorption axis direction of the above-mentioned polarizer and the phase slow axis direction of the retardation film are substantially 45°. In the present specification, 'substantially 45°' includes the case where the angle between the absorption axis direction of the polarizer and the phase slow axis direction of the retardation film is 45°±2.0°, preferably 45°±1.0° and more preferably 45°±0.5°. According to such an embodiment, a circularly polarizing plate can be obtained, which is so excellent as to be capable of converting linearly polarized light into circularly polarized light (or circularly polarized light into linearly polarized light) in a wide region of visible light.

Practically, an adhesive layer (not shown in the drawing) is provided between the above-mentioned polarizer and each of the members (optional protective layer, optical film and retardation film) adjacent thereto to stick the polarizer and each of the members. Thus, the disposition of an optical film or a retardation film of the present invention on at least one side of the polarizer allows a liquid crystal display device excellent in display uniformity, for example. In the present specification, the adhesive layer signifies such as to join planes of adjacent optical members, which are integrated by practically sufficient adhesive force and adhesive time. Examples of a material for forming the adhesive layer include an adhesive agent, a pressure-sensitive agent and an anchor coat agent. The adhesive layer may be a multi-layered structure such that an anchor coat layer is formed on the surface of an adherend to form an adhesive agent layer or a pressure-sensitive agent layer thereon, or a thin layer unrecognizable with the naked eye (also called hairline). The adhesive layer disposed on one side of the polarizer and the adhesive layer disposed on the other side thereof may be the same or different.

The above-mentioned polarizer can properly adopt so appropriate a polarizer as to convert natural light or polarized light into linearly polarized light. The polarizer is preferably a stretched film having as the main component polyvinyl alcohol resin containing iodine or dichromatic dye. In the present specification, 'stretched film' signifies a polymeric film such that tension is applied to an unstretched film at appropriate temperature to improve orientation of molecules along the direction of pull.

The thickness of the above-mentioned polarizer can be selected at an appropriate value depending on the purpose. The thickness of the polarizer is preferably 5 to 50 μm, more preferably 10 to 30 μm.

A method of obtaining the above-mentioned polymeric film having polyvinyl alcohol resin as the main component can adopt an optional appropriate molding processing method. Examples of the molding processing method include a method described in Japanese Unexamined Patent Publication No. 2000-315144 [Example 1].

The above-mentioned dichromatic substance can adopt an optional appropriate substance. In the present specification, 'dichromatic' signifies optical anisotropy such that two directions of the optical axis direction and the orthogonal direction thereto differ in absorption of light. Examples of the dichromatic dye include red BR, red LR, red R, pink LB, rubine BL, Bordeaux GS, sky blue LG, lemon yellow, blue BR, blue 2R, navy RY, green LG, violet LB, violet B, black H, black B, black GSP, yellow 3G, yellow R, orange LR, orange 3R, scarlet GL, scarlet KGL, congo red, brilliant violet BK, supra blue G, supra blue GL, supra orange GL, direct sky blue, direct first orange S and first black.

Commercially available films can also be used directly for the polymeric film having polyvinyl alcohol resin as the main component to be used for the present invention. Examples of commercial polymeric film having polyvinyl alcohol resin as the main component include "Kuraray vinylon film", trade name, manufactured by Kuraray Co., Ltd., "Tohcello vinylon film", trade name, manufactured by Tohcello Co., Ltd. and "Nichigo vinylon film", trade name, manufactured by Nippon Synthetic Chemical Industry Co., Ltd.

Figure 3:
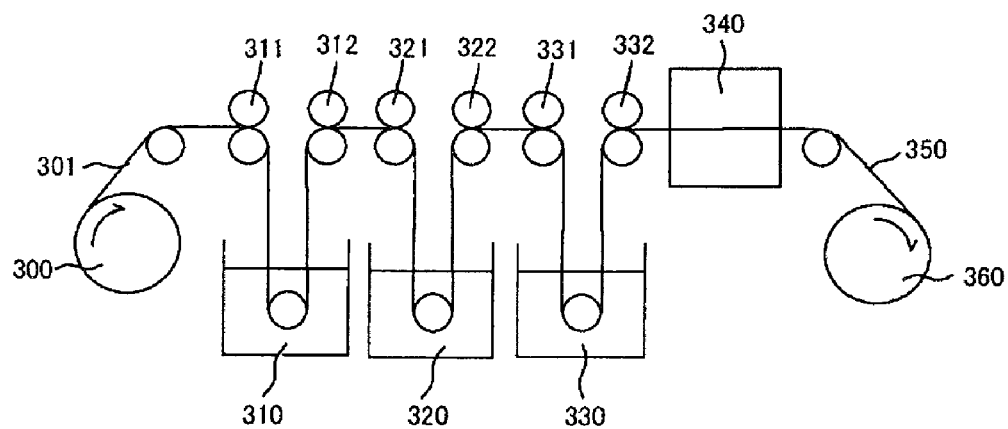
FIG. 3 is a schematic view showing the concept of a typical production process of a polarizer used for the present invention.

One example of producing methods of a polarizer is described by referring to FIG. 3. FIG. 3 is a schematic view showing the concept of a typical production process of a polarizer used for the present invention. For example, a polymeric film 301 having polyvinyl alcohol resin as the main component is reeled out from a delivery unit 300, immersed in an iodine aqueous solution bath 310, and subjected to swelling and dyeing processes while provided with tension in the longitudinal direction of the film by rolls 311 and 312 which differ in rotation speed ratio. Next, the film is immersed in a bath 320 of an aqueous solution containing boric acid and potassium iodide, and subjected to crosslinking treatment while provided with tension in the longitudinal direction of the film by rolls 321 and 322 which differ in rotation speed ratio. The film with crosslinking treated is immersed in a bath 330 of aqueous solution containing potassium iodide by rolls 331 and 332, and subjected to water washing treatment. The film with water washing treated is dried by a drying means 340 for adjusting degree of moisture to, for example, 10 to 30%, and reeled up in a winding unit 360. A polarizer 350 can be obtained by drawing the polymeric film having polyvinyl alcohol resin as the main component by 5 to 7 times the original length thereof through these processes.

The above-mentioned optional protective layer can properly adopt an appropriate layer. The protective layer is used for preventing the polarizer from contracting, expanding and deteriorating by ultraviolet rays. The protective layer is preferably a polymeric film containing cellulosic resin or norbornene resin. The thickness of the polymeric film is typically 10 to 200 μm. The protective layer may serve also for a base film of the after-mentioned surface treatment layer. Commercially available polymeric films can also be used directly for the protective layer. Alternatively, commercially available polymeric films can also be used by performing the after-mentioned surface treatment. Examples of commercial polymeric film containing cellulosic resin include FUJITAC series manufactured by Fujifilm Corporation and "KC8UX2M", trade name, manufactured by Konica Minolta Opto Products Co., Ltd. Examples of commercial polymeric film containing norbornene resin include ARTON series manufactured by JSR Corporation and ZEONOR series manufactured by Optes Inc.

In referring to FIGS. 1 and 2, an optional surface treatment layer can be formed on the surface of optional protective layers 2 and 2' as well as optical films 3 and 3'. Examples of the surface treatment layer to be used include a treatment layer subject to hard coat treatment, antistatic treatment, reflection reducing treatment (also called antireflection treatment) and diffusion treatment (also called antiglare treatment). These surface treatment layers are used for the purpose of preventing stain and scratch on a screen, and preventing a display image from appearing with difficulty for the reason that fluorescent light in a room and sunbeam are reflected in the screen. The surface treatment layer to be used is generally such that a treating agent for forming the treatment layer is firmly fixed on the surface of a base film. The above-mentioned base film may serve also for the protective layers or optical films. In addition, the surface treatment layer may be, for example, a multi-layered structure such that a hard coat treatment layer is laminated on an antistatic treatment layer. Commercially available surface treatment layers can also be used directly for the surface treatment layer. Examples of commercial film with hard coat treatment and antistatic treatment performed include "KC8UX-HA", trade name, manufactured by Konica Minolta Opto Products Co., Ltd. Examples of commercial surface treatment layer with reflection reducing treatment performed include REALOOK series manufactured by NOF Corporation.

EXAMPLES

The present invention is further described by using the following examples. The present invention is not limited to only these examples. Each analysis method used in the examples is as follows.

(1) Measurement of Composition Ratio:

The composition ratio was measured by using a nuclear magnetic resonance spectrometer [trade name "LA400", manufactured by JEOL Ltd.] (solvent for measuring; heavy DMSO, frequency; 400 MHz, transmitter nucleus; $^1$H, measured temperature; 70° C.).

(2) Method of Measuring Glass Transition Temperature:

This was measured using a differential scanning calorimeter [trade name: "DSC-6200", manufactured by Seiko Instruments Inc.] by a method according to JIS K 7121 (1987) (Method of measuring a transition temperature of plastics). Specifically, 3 mg of a powder sample was heated (heating speed: 10° C./min) in a nitrogen atmosphere (flow rate of gas: 80 ml/min) to raise the temperature of the sample, thereby measuring the temperature twice, to adopt the second data. The temperature of the calorimeter was calibrated using a standard material (indium).

(3) Method of Measuring Thickness:

When the thickness was less than 10 μm, it was measured by spectrophotometer for a thin film [trade name: "Multi Channel Photo Detector MCPD-2000", manufactured by Otsuka Electronics Co., Ltd.]. When the thickness was 10 μm or more, it was measured by using a digital micrometer (trade name: "KC-351C Model", manufactured by Anritsu Corporation].

(4) Measuring Method of Refractive Index of Film:

The refractive index was measured at light with a wavelength of 589 nm and a temperature of 23° C. by using an Abbe refractometer [trade name "DR-M4", manufactured by ATAGO Co., Ltd.].

(5) Measuring Method of Retardation Values (Re, Rth):

The retardation values were measured in a room at a temperature of 23° C. by using a retardation meter on the principle of a parallel nicols rotation method [trade name "KOBRA21-ADH", manufactured by OJI SCIENTIFIC INSTRUMENTS].

(6) Measuring Method of Transmittance (T[550]):

The transmittance was measured at light with a wavelength of 550 nm and a temperature of 23° C. by using an ultraviolet-visible spectrophotometer [trade name "V-560", manufactured by JASCO Corporation].

(7) Measuring Method of Absolute Value (C[550]) of Photoelastic Coefficient:

Both ends of a sample (a size of 2 cm×10 cm) were nipped while applying a stress (5 to 15 N) to measure a retardation value (23° C./wavelength of 550 nm) in the middle of the sample by using a spectroscopic ellipsometer [trade name "M-220", manufactured by JASCO Corporation], and then the absolute value (C[550]) was calculated from the slope of a function of the stress and the retardation value.

(8) Measuring Method of Simple Transmittance, Polarization Degree and Hue of Polarizer:

The simple transmittance, polarization degree and hue were measured in a room at a temperature of 23° C. by using a spectrophotometer [trade name "DOT-3", manufactured by Murakami Color Research Laboratory].

Example 1

8.8 g of polyvinyl alcohol resin [trade name "NH-18", manufactured by Nippon Synthetic Chemical Industry Co., Ltd. (polymerization degree=1800, saponification degree=99.0%)] was dried at a temperature of 105° C. for 2 hours and thereafter dissolved in 167.2 g of dimethyl sulfoxide (DMSO). 2.98 g of 2-methoxy-1-naphthaldehyde and 0.80 g of para-toluenesulfonic acid monohydrate were added thereto and stirred at a temperature of 40° C. for 1 hour. 23.64 g of 1,1-diethoxyethane (acetal) was further added to the reaction solution and stirred at a temperature of 40° C. for 4 hours. Thereafter, 2.13 g of triethylamine was added thereto to finish the reaction. The obtained crude product was subject to reprecipitation by 1 L-methanol. The filtered polymer was dissolved in tetrahydrofuran and subject to reprecipitation by methanol again. This was filtered and dried to obtain 12.7 g of a white polymer. When measured by $^1$H-NMR, this polymer had a repeating unit represented by the following formula (X) and the ratio (molar ratio) of l:m:n was 12:60:28. The glass transition temperature of this polymer measured by a differential scanning calorimeter was 127° C.

$^1$H-NMR (DMSO): 0.8-2.3 (main chain methylene and methyl of an acetal portion), 3.4-4.4 (main chain methine to which an oxygen atom was bonded, methyl of a methoxy group and a hydroxyl group), 4.5-5.1 (methine of an acetal portion), 6.4 (methine of 2-methoxynaphthalene portion), 7.3-8.8 (aromatic proton of 2-methoxynaphthalene portion)

[Chemical Formula 8]

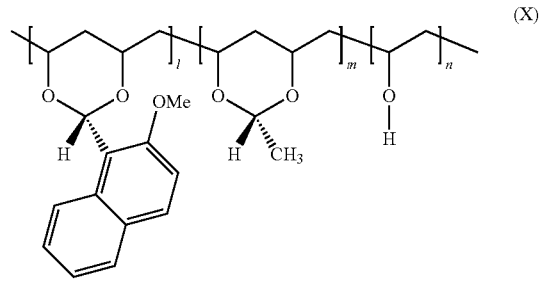

(X)

The above-mentioned polymer was dissolved in methyl ethyl ketone (MEK), applied on a polyethylene terephthalate film [trade name "LUMIRROR S-27E", manufactured by Toray Industries, Inc.] with a thickness of 70 μm by an applicator, dried in an air-circulating drying oven and thereafter peeled off the polyethylene terephthalate film to produce an optical film with a thickness of 98 μm. This optical film was drawn by a drawing machine in the air-circulating drying oven at a temperature of 140° C. by 1.5 times to produce a retardation film A-1. The properties of the obtained retardation film A-1 are shown in Table 1.

TABLE 1

| | Example 1 | Example 2 | Example 3 | Example 4 | Example 5 | Example 6 | Example 7 |
|---|---|---|---|---|---|---|---|
| Retardation film | A-1 | A-2 | B-1 | C | D | E | B-2 |
| Thickness (μm) | 67 | 64 | 71 | 65 | 59 | 59 | 62 |
| Glass transition temperature (° C.) | 127 | 131 | 123 | 124 | 122 | 136 | 132 |

TABLE 1-continued

|  | Example 1 | Example 2 | Example 3 | Example 4 | Example 5 | Example 6 | Example 7 |
|---|---|---|---|---|---|---|---|
| Transmittance (%) | 92 | 92 | 92 | 92 | 92 | 92 | 92 |
| Re[450](nm) | 186.5 | 143.0 | 191.2 | 136.8 | 141.1 | 32.3 | 157 |
| Re[550](nm) | 200.7 | 160.0 | 220.3 | 148.8 | 154.1 | 56.4 | 181 |
| Re[650](nm) | 207.0 | 168.5 | 234.5 | 155.0 | 160.5 | 70.2 | 191 |
| Re[450]/Re[550] | 0.929 | 0.894 | 0.868 | 0.919 | 0.916 | 0.573 | 0.869 |
| Re[650]/Re[550] | 1.031 | 1.053 | 1.064 | 1.042 | 1.042 | 1.245 | 1.054 |
| Re[550]-Re[450] | 14.2 | 17.0 | 29.1 | 12.0 | 13.0 | 24.1 | 23.7 |
| Re[550]-Re[650] | −6.3 | −8.5 | −14.2 | −6.2 | −6.4 | −13.8 | −9.8 |
| Re[650]-Re[450] | 20.5 | 25.5 | 43.3 | 18.2 | 19.4 | 37.9 | 33.5 |

Example 2

12.42 g of a white polymer was obtained in the same manner as Example 1 except for modifying the used amount of 2-methoxy-1-naphthaldehyde into 3.72 g. When measured by $^1$H-NMR, this polymer had a repeating unit represented by the following formula (X) and the ratio (molar ratio) of l:m:n was 13:50:37. The glass transition temperature of this polymer measured by a differential scanning calorimeter was 131° C.

The above-mentioned polymer was dissolved in methyl ethyl ketone (MEK), applied on a polyethylene terephthalate film [trade name "LUMIRROR S-27E", manufactured by Toray Industries, Inc.] with a thickness of 70 μm by an applicator, dried in an air-circulating drying oven and thereafter peeled off the polyethylene terephthalate film to produce an optical film with a thickness of 96 μm. This optical film was drawn by a drawing machine in the air-circulating drying oven at a temperature of 150° C. by 1.5 times to produce a retardation film A-2. The properties of the obtained retardation film A-2 are shown in Table 1.

Example 3

8.8 g of polyvinyl alcohol resin [trade name "NH-18", manufactured by Nippon Synthetic Chemical Industry Co., Ltd. (polymerization degree=1800, saponification degree=99.0%)] was dried at a temperature of 105° C. for 2 hours and thereafter dissolved in 167.2 g of dimethyl sulfoxide (DMSO). 2.98 g of 2-methoxy-1-naphthaldehyde and 0.80 g of para-toluenesulfonic acid monohydrate were added thereto and stirred at a temperature of 40° C. for 1 hour. 3.18 g of benzaldehyde was added to the reaction solution and stirred at a temperature of 40° C. for 1 hour, and thereafter 23.60 g 1,1-diethoxyethane (acetal) was further added thereto and stirred at a temperature of 40° C. for 3 hours. Thereafter, 2.13 g of triethylamine was added thereto to finish the reaction. The obtained crude product was subject to reprecipitation by 1 L-methanol. The filtered polymer was dissolved in tetrahydrofuran and subject to reprecipitation by methanol again. This was filtered and dried to obtain 11.5 g of a white polymer. When measured by $^1$H-NMR, this polymer had a repeating unit represented by the following formula (XI) and the ratio (molar ratio) of l:m:n:o was 11:37:45:7. The glass transition temperature of this polymer measured by a differential scanning calorimeter was 123° C. The absolute value (C[550]) of photoelastic coefficient thereof was 2.4×10$^{-11}$ (m$^2$/N).

$^1$H-NMR (DMSO): 0.8-2.3 (main chain methylene and methyl of an acetal portion), 3.4-4.4 (main chain methine to which an oxygen atom was bonded, methyl of a methoxy group and a hydroxyl group), 4.5-5.1 (methine of an acetal portion), 5.4-5.9 (methine of benzene portion), 6.4 (methine of 2-methoxynaphthalene portion), 7.1-7.5 (2-methoxynaphthalene and aromatic proton of benzene portion), 7.7-8.8 (aromatic proton of 2-methoxynaphthalene portion)

[Chemical Formula 9]

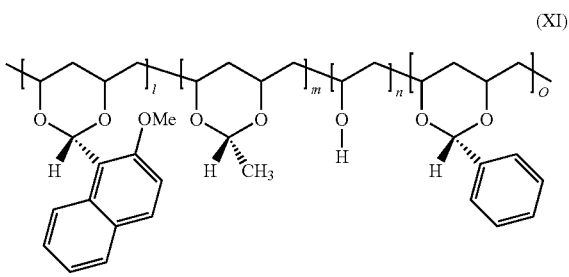

(XI)

The above-mentioned polymer was dissolved in methyl ethyl ketone (MEK), applied on a polyethylene terephthalate film [trade name "LUMIRROR S-27E", manufactured by Toray Industries, Inc.] with a thickness of 70 μm by an applicator, dried in an air-circulating drying oven and thereafter peeled off the polyethylene terephthalate film to produce an optical film with a thickness of 117 μm. This optical film was drawn by a drawing machine in the air-circulating drying oven at a temperature of 140° C. by 1.5 times to produce a retardation film B. The properties of the obtained retardation film B are shown in Table 1.

Example 4

14.3 g of a white polymer was obtained in the same manner as Example 3 except for adding 4.69 g of 2-naphthaldehyde instead of benzaldehyde. When measured by $^1$H-NMR, this polymer had a repeating unit represented by the following formula (XII) and the ratio (molar ratio) of l:m:n:q was 10:30:52:8. The glass transition temperature of this polymer measured by a differential scanning calorimeter was 124° C.

[Chemical Formula 10]

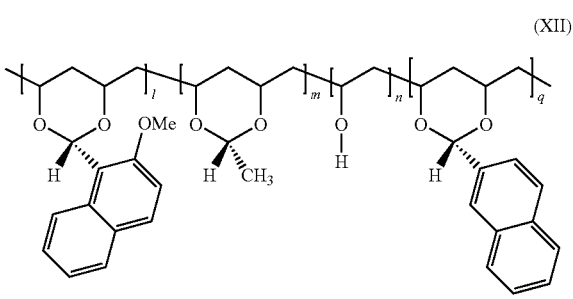

(XII)

The above-mentioned polymer was dissolved in methyl ethyl ketone (MEK), applied on a polyethylene terephthalate film [trade name "LUMIRROR S-27E", manufactured by Toray Industries, Inc.] with a thickness of 70 μm by an applicator, dried in an air-circulating drying oven and thereafter peeled off the polyethylene terephthalate film to produce an optical film with a thickness of 101 μm. This optical film was drawn by a drawing machine in the air-circulating drying oven at a temperature of 145° C. by 1.5 times to produce a retardation film C. The properties of the obtained retardation film C are shown in Table 1.

Example 5

15.54 g of a white polymer was obtained in the same manner as Example 3 except for adding 3.56 g of cyclohexane carboxyaldehyde instead of benzaldehyde. When measured by $^1$H-NMR, this polymer had a repeating unit represented by the following formula (XIII) and the ratio (molar ratio) of l:m:n:r was 13:27:36:23. The glass transition temperature of this polymer measured by a differential scanning calorimeter was 122° C.

[Chemical Formula 11]

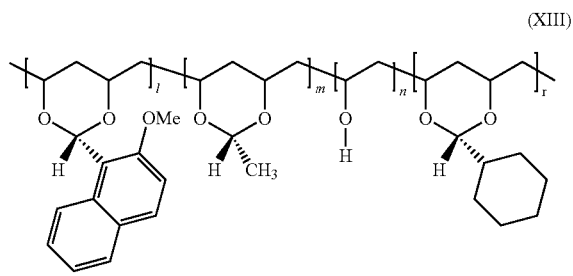

(XIII)

The above-mentioned polymer was dissolved in methyl ethyl ketone (MEK), applied on a polyethylene terephthalate film [trade name "LUMIRROR S-27E", manufactured by Toray Industries, Inc.] with a thickness of 70 μm by an applicator, dried in an air-circulating drying oven and thereafter peeled off the polyethylene terephthalate film to produce an optical film with a thickness of 95 μm. This optical film was drawn by a drawing machine in the air-circulating drying oven at a temperature of 139° C. by 1.5 times to produce a retardation film D. The properties of the obtained retardation film D are shown in Table 1.

Example 6

15.6 g of a white polymer was obtained in the same manner as Example 3 except for adding 4.87 g of para-tert-butylbenzaldehyde instead of benzaldehyde. When measured by $^1$H-NMR, this polymer had a repeating unit represented by the following formula (XIV) and the ratio (molar ratio) of l:m:n:s was 9:29:53:8. The glass transition temperature of this polymer measured by a differential scanning calorimeter was 136° C.

[Chemical Formula 12]

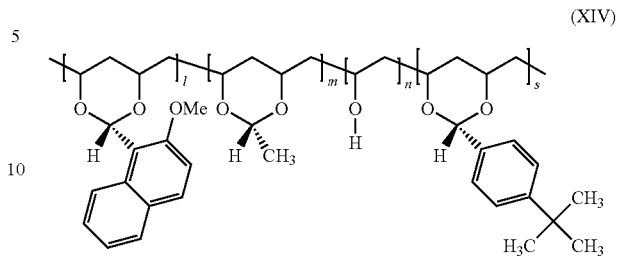

(XIV)

The above-mentioned polymer was dissolved in methyl ethyl ketone (MEK), applied on a polyethylene terephthalate film [trade name "LUMIRROR S-27E", manufactured by Toray Industries, Inc.] with a thickness of 70 μm by an applicator, dried in an air-circulating drying oven and thereafter peeled off the polyethylene terephthalate film to produce an optical film with a thickness of 104 μm. This optical film was drawn by a drawing machine in the air-circulating drying oven at a temperature of 142° C. by 1.5 times to produce a retardation film E. The properties of the obtained retardation film E are shown in Table 1.

Example 7

11.5 g of a white polymer was obtained in the same manner as Example 3 except for modifying the used amount of 2-methoxy-1-naphthaldehyde into 3.17 g. When measured by $^1$H-NMR, this polymer had a repeating unit represented by the following formula (XI) and the ratio (molar ratio) of l:m:n:o was 13:38:41:8. The glass transition temperature of this polymer measured by a differential scanning calorimeter was 132° C.

The above-mentioned polymer was dissolved in methyl ethyl ketone (MEK), applied on a polyethylene terephthalate film with a thickness of 70 μm by an applicator, dried in an air-circulating drying oven and thereafter peeled off the polyethylene terephthalate film to produce an optical film with a thickness of 106 μm. This optical film was drawn by a drawing machine in the air-circulating drying oven at a temperature of 138° C. by 1.5 times to produce a retardation film B-2. The properties of the obtained retardation film B-2 are shown in Table 1.

Example 8

11.7 g of a white polymer was obtained in the same manner as Example 3 except for modifying the used amount of 2-methoxy-1-naphthaldehyde into 3.35 g. When measured by $^1$H-NMR, this polymer had a repeating unit represented by the following formula (XI) and the ratio (molar ratio) of l:m:n:o was 13:40:39:8. The glass transition temperature of this polymer measured by a differential scanning calorimeter was 132° C.

The above-mentioned polymer was dissolved in methyl ethyl ketone (MEK), applied on a polyethylene terephthalate film with a thickness of 70 μm by an applicator, dried in an air-circulating drying oven and thereafter peeled off the polyethylene terephthalate film to produce an optical film with a thickness of 110 μm. This optical film was drawn by a drawing machine in the air-circulating drying oven at a temperature of 138° C. by 1.5 times to produce a retardation film B-3. The properties of the obtained retardation film B-3 are shown in Table 2.

TABLE 2

|  | Example 8 | Example 9 | Example 10 | Example 11 | Example 12 | Example 13 | Reference Example |
|---|---|---|---|---|---|---|---|
| Retardation film | B-3 | B-4 | B-5 | B-6 | B-7 | F | x |
| Thickness (μm) | 55 | 60 | 66 | 62 | 54 | 58 | 60 |
| Glass transition temperature (° C.) | 132 | 133 | 136 | 130 | 130 | 135 | 120 |
| Transmittance (%) | 92 | 92 | 92 | 92 | 92 | 92 | 92 |
| Re[450](nm) | 130 | 111 | 93 | 137 | 208 | 81 | 93.0 |
| Re[550](nm) | 153 | 136 | 121 | 154 | 220 | 105 | 95.1 |
| Re[650](nm) | 163 | 146 | 132 | 162 | 224 | 115 | 94.9 |
| Re[450]/Re[550] | 0.848 | 0.816 | 0.769 | 0.887 | 0.944 | 0.767 | 0.978 |
| Re[650]/Re[550] | 1.067 | 1.074 | 1.090 | 1.047 | 1.017 | 1.097 | 1.001 |
| Re[550]-Re[450] | 23.3 | 25.0 | 27.9 | 17.4 | 12.3 | 24.5 | 2.1 |
| Re[550]-Re[650] | −10.2 | −10.0 | −10.9 | −7.2 | −3.8 | −10.2 | 0.2 |
| Re[650]-Re[450] | 33.5 | 35.0 | 38.8 | 24.6 | 16.1 | 34.7 | 1.9 |

Example 9

11.7 g of a white polymer was obtained in the same manner as Example 3 except for modifying the used amount of 2-methoxy-1-naphthaldehyde into 3.53 g. When measured by $^1$H-NMR, this polymer had a repeating unit represented by the following formula (XI) and the ratio (molar ratio) of l:m:n:o was 13:43:37:8. The glass transition temperature of this polymer measured by a differential scanning calorimeter was 133° C.

The above-mentioned polymer was dissolved in methyl ethyl ketone (MEK), applied on a polyethylene terephthalate film with a thickness of 70 μm by an applicator, dried in an air-circulating drying oven and thereafter peeled off the polyethylene terephthalate film to produce an optical film with a thickness of 103 μm. This optical film was drawn by a drawing machine in the air-circulating drying oven at a temperature of 139° C. by 1.5 times to produce a retardation film B-4. The properties of the obtained retardation film B-4 are shown in Table 2.

Example 10

11.8 g of a white polymer was obtained in the same manner as Example 3 except for modifying the used amount of 2-methoxy-1-naphthaldehyde into 3.71 g. When measured by $^1$H-NMR, this polymer had a repeating unit represented by the following formula (XI) and the ratio (molar ratio) of l:m:n:o was 14:39:39:8. The glass transition temperature of this polymer measured by a differential scanning calorimeter was 136° C.

The above-mentioned polymer was dissolved in methyl ethyl ketone (MEK), applied on a polyethylene terephthalate film with a thickness of 70 μm by an applicator, dried in an air-circulating drying oven and thereafter peeled off the polyethylene terephthalate film to produce an optical film with a thickness of 104 μm. This optical film was drawn by a drawing machine in the air-circulating drying oven at a temperature of 139° C. by 1.5 times to produce a retardation film B-5. The properties of the obtained retardation film B-5 are shown in Table 2.

Example 11

11.9 g of a white polymer was obtained in the same manner as Example 3 except for adding 4.57 g of dimethylacetal instead of 1,1-diethoxyethane. When measured by $^1$H-NMR, this polymer had a repeating unit represented by the following formula (XI) and the ratio (molar ratio) of l:m:n:o was 10:25:52:11. The glass transition temperature of this polymer measured by a differential scanning calorimeter was 130° C.

The above-mentioned polymer was dissolved in methyl ethyl ketone (MEK), applied on a polyethylene terephthalate film with a thickness of 70 μm by an applicator, dried in an air-circulating drying oven and thereafter peeled off the polyethylene terephthalate film to produce an optical film with a thickness of 96 μm. This optical film was drawn by a drawing machine in the air-circulating drying oven at a temperature of 139° C. by 1.5 times to produce a retardation film B-6. The properties of the obtained retardation film B-6 are shown in Table 2.

Example 12

11.5 g of a white polymer was obtained in the same manner as Example 3 except for adding 8.81 g of acetaldehyde instead of 1,1-diethoxyethane. When measured by $^1$H-NMR, this polymer had a repeating unit represented by the following formula (XI) and the ratio (molar ratio) of l:m:n:o was 12:53:28:7. The glass transition temperature of this polymer measured by a differential scanning calorimeter was 130° C.

The above-mentioned polymer was dissolved in methyl ethyl ketone (MEK), applied on a polyethylene terephthalate film with a thickness of 70 μm by an applicator, dried in an air-circulating drying oven and thereafter peeled off the polyethylene terephthalate film to produce an optical film with a thickness of 95 μm. This optical film was drawn by a drawing machine in the air-circulating drying oven at a temperature of 139° C. by 1.5 times to produce a retardation film B-7. The properties of the obtained retardation film B-7 are shown in Table 2.

Example 13

8.8 g of polyvinyl alcohol resin [trade name "NH-18", manufactured by Nippon Synthetic Chemical Industry Co., Ltd. (polymerization degree=1800, saponification degree=99.0%)] was dried at a temperature of 105° C. for 2 hours and thereafter dissolved in 167.2 g of dimethyl sulfoxide (DMSO). 2.98 g of 2-methoxy-1-naphthaldehyde and 0.80 g of para-toluenesulfonic acid monohydrate were added thereto and stirred at a temperature of 40° C. for 1 hour. 3.18 g of benzaldehyde was added to the reaction solution and stirred at a temperature of 40° C. for 1 hour, and thereafter 10.4 g of 2,2-dimethoxypropane was further added thereto and stirred at a temperature of 40° C. for 3 hours. Thereafter, 2.13 g of triethylamine was added thereto to finish the reaction. The obtained crude product was subject to reprecipitation by 1 L-methanol. The filtered polymer was dissolved in tetrahydrofuran and subject to reprecipitation by methanol again. This was filtered and dried to obtain 18.8 g of a white polymer. When measured by $^1$H-NMR, this polymer had a repeating unit represented by the following formula (XV) and the ratio (molar ratio) of l:m:n:o was 13:31:43:13. The glass transition temperature of this polymer measured by a differential scanning calorimeter was 135° C.

$^1$H-NMR (DMSO): 0.8-2.3 (main chain methylene and methyl of an acetal portion), 3.4-4.4 (main chain methine to which an oxygen atom was bonded, methyl of a methoxy group and a hydroxyl group), 5.4-5.9 (methine of benzene portion), 6.4 (methine of 2-methoxynaphthalene portion), 7.1-7.5 (2-methoxynaphthalene and aromatic proton of benzene portion), 7.7-8.8 (aromatic proton of 2-methoxynaphthalene portion)

[Chemical Formula 13]

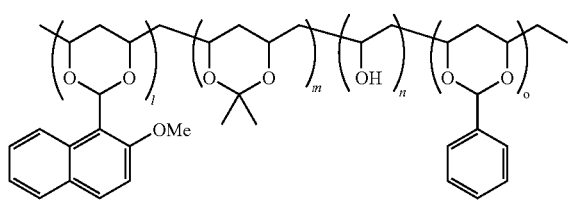

(XV)

The above-mentioned polymer was dissolved in methyl ethyl ketone (MEK), applied on a polyethylene terephthalate film with a thickness of 70 μm by an applicator, dried in an air-circulating drying oven and thereafter peeled off the polyethylene terephthalate film to produce an optical film with a thickness of 94 μm. This optical film was drawn by a drawing machine in the air-circulating drying oven at a temperature of 139° C. by 1.5 times to produce a retardation film F. The properties of the obtained retardation film F are shown in Table 2.

Reference Example 11.3 g of a white polymer was obtained in the same manner as Example 1 except for using 3.18 g of benzaldehyde instead of 2-methoxy-1-naphthaldehyde. When measured by $^1$H-NMR, this polymer had a repeating unit represented by the following formula (XX) and the ratio (molar ratio) of l:m:n was 24:63:13. The glass transition temperature of this polymer measured by a differential scanning calorimeter was 120° C.

[Chemical Formula 14]

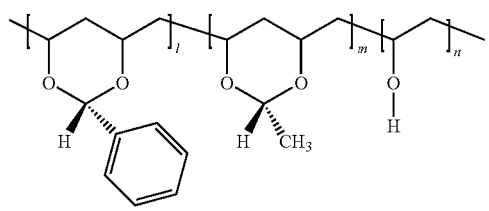

(XX)

The above-mentioned polymer was dissolved in methyl ethyl ketone (MEK), applied on a polyethylene terephthalate film [trade name "LUMIRROR S-27E", manufactured by Toray Industries, Inc.] with a thickness of 70 μm by an applicator, dried in an air-circulating drying oven and thereafter peeled off the polyethylene terephthalate film to produce an optical film with a thickness of 101 μm. This optical film was drawn by a drawing machine in the air-circulating drying oven at a temperature of 140° C. by 1.5 times to produce a retardation film X. The properties of the obtained retardation film X are shown in Table 2.

[Evaluations]

Figure 4:
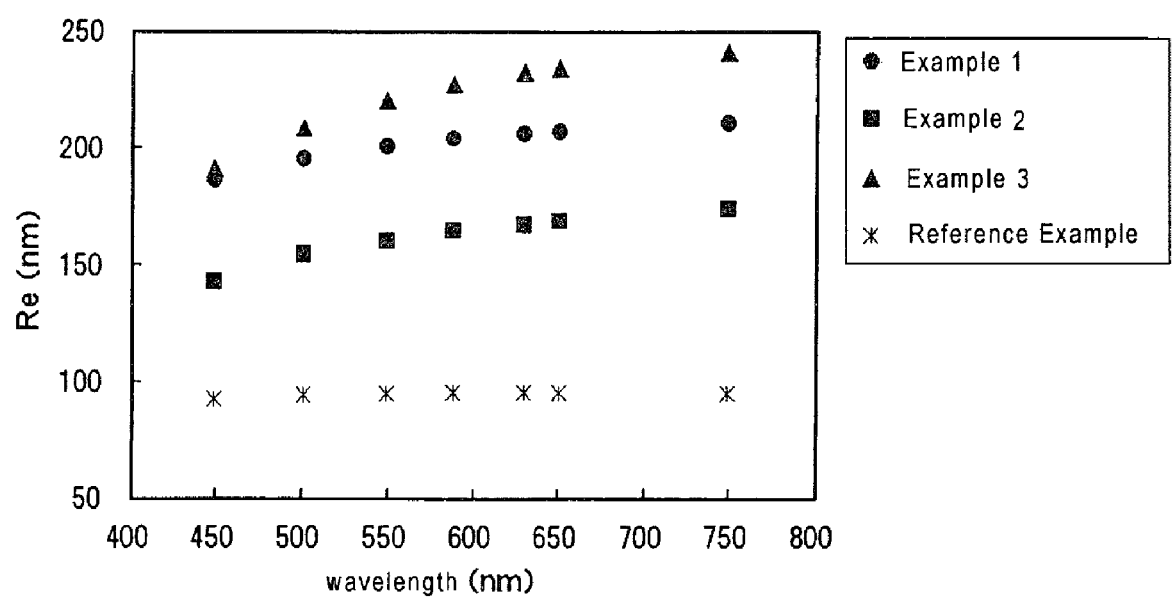
FIG. 4 is a graph showing wavelength dependence of retardation in a plane in a visible light region with regard to a retardation film of examples.
Figure 5:
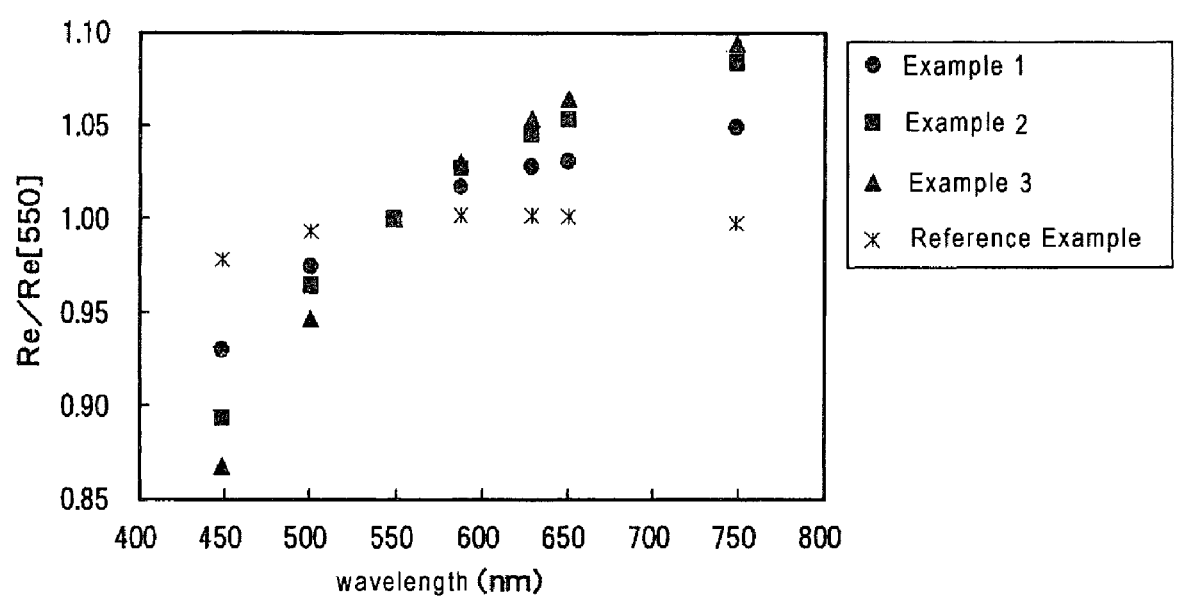
FIG. 5 is a graph showing standardization of retardation value in a plane in a visible light region at light with a wavelength of 550 nm with regard to a retardation film of examples.

FIG. 4 is a graph showing wavelength dependence of retardation in a plane in a visible light region with regard to a retardation film of examples. FIG. 5 is a graph showing standardization of retardation value in a plane in a visible light region at light with a wavelength of 550 nm with regard to a retardation film of examples. As shown in FIGS. 4 and 5, the retardation films obtained in Examples 1 to 3 exhibited properties (inverse wavelength dispersion properties), such that higher retardation value is offered in measuring by light with longer wavelength. Similarly, the retardation films obtained in Examples 4 to 13 exhibited inverse wavelength dispersion properties. The retardation film obtained in Reference Example exhibited no inverse wavelength dispersion properties for the reason that the retardation value was constant regardless of measuring wavelength.

As described above, an optical film of the present invention is useful for various optical members by reason of being excellent in transparency, heat resistance and processability. A retardation film employing the optical film is useful for improving display properties of a liquid crystal display device by reason of being excellent also in wavelength dependence of retardation.

What is claimed is:

1. An optical film containing a polymer having at least a repeating unit represented by following general formula (I):

[Chemical Formula 1]

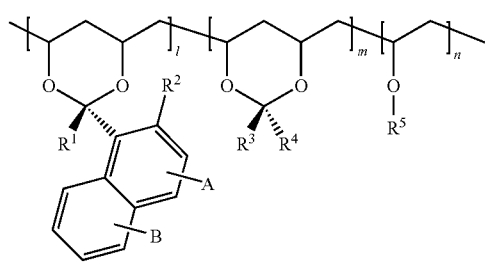

(I)

wherein in the general formula (I), $R^1$, A and B denote a hydrogen atom; $R^3$ denotes a hydrogen atom or a straight-chain or branched alkyl group with a carbon number of 1 to 4; $R^2$ denotes a halogen atom, a straight-chain or branched alkyl group with a carbon number of 1 to 4, a straight-chain or branched alkyl halide group with a carbon number of 1 to 4, a straight-chain or branched alkoxy group with a carbon number of 1 to 4, an alkoxycarbonyl group, an acyloxy group, an amino group, an azide group, a nitro group, a cyano group or a hydroxyl group; $R^4$ denotes a straight-chain or branched alkyl group with a carbon number of 1 to 4, a substituted or unsubstituted cycloalkyl group with a carbon number of 5 to 10, a substituted or unsubstituted phenyl group, or a substituted or unsubstituted naphthyl group; $R^5$ denotes a hydrogen atom, a straight-chain or branched alkyl group with a carbon number of 1 to 4, a benzyl group, a silyl group, a phosphoric acid group, an acyl group, a benzoyl group or a sulfonyl group; l, m and n denote an integer of 2 or more.

2. The optical film according to claim 1, wherein $R^3$ of the polymer is hydrogen atoms.

3. The optical film according to claim 1, wherein $R^2$ of the polymer is a methoxy group.

4. The optical film according to claim 1, wherein $R^4$ of the polymer is a straight-chain or branched alkyl group with a carbon number of 1 to 4.

5. The optical film according to claim 1, wherein a ratio; l/m (mol/mol) of l and m of the polymer is 0.10 to 0.50.

6. The optical film according to claim 1, wherein $R^5$ of the polymer is a hydrogen atom, a trimethylsilyl group, a triethylsilyl group or a tert-butylsilyl group.

7. The optical film according to claim 1, wherein a glass transition temperature of the polymer is 90 to 190° C.

8. The optical film according to claim 1, wherein the optical film has a thickness of 10 to 300 μm.

9. A retardation film obtained by orienting the optical film according to claim 1.

10. The retardation film according to claim 9, wherein an in-plane birefringence (Δn[550]) at a temperature of 23° C., measured by light with a wavelength of 550 nm, is 0.001 to 0.1.

11. The retardation film according to claim 9, wherein an in-plane retardation value (Re[550]) at a temperature of 23° C., measured by light with a wavelength of 550 nm, is 50 to 500 nm.

12. The retardation film according to claim 9, wherein an in-plane retardation value (Re[550]) measured by light with a wavelength of 550 nm is larger at a temperature of 23° C. than an in-plane retardation value (Re[450]) measured by light with a wavelength of 450 nm.

13. The retardation film according to claim 9, wherein an in-plane retardation value (Re[550]) measured by light with a wavelength of 550 nm is smaller at a temperature of 23° C. than an in-plane retardation value (Re[650]) measured by light with a wavelength of 650 nm.

14. A polarizing plate having at least the retardation film according to claim 9 and a polarizer.

15. The polarizing plate according to claim 14, wherein an absorption axis direction of the polarizer and a phase slow axis direction of the retardation film are substantially parallel or substantially orthogonal.

16. The polarizing plate according to claim 14, wherein an absorption axis direction of the polarizer and a phase slow axis direction of the retardation film are substantially 45°.

17. A polarizing plate having at least the optical film according to claim 1 and a polarizer.

* * * * *